(12) United States Patent
Matsuo et al.

(10) Patent No.: US 12,238,355 B2
(45) Date of Patent: Feb. 25, 2025

(54) INFORMATION PROCESSING APPARATUS, ANALYSIS METHOD AND PROGRAM

(71) Applicant: NIPPON TELEGRAPH AND TELEPHONE CORPORATION, Tokyo (JP)

(72) Inventors: Yoichi Matsuo, Tokyo (JP); Kazuhisa Yamagishi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/264,504

(22) PCT Filed: Mar. 10, 2021

(86) PCT No.: PCT/JP2021/009556
§ 371 (c)(1),
(2) Date: Aug. 7, 2023

(87) PCT Pub. No.: WO2022/190263
PCT Pub. Date: Sep. 15, 2022

(65) Prior Publication Data
US 2024/0114187 A1   Apr. 4, 2024

(51) Int. Cl.
*H04N 21/258* (2011.01)
*H04N 21/24* (2011.01)
*H04N 21/442* (2011.01)

(52) U.S. Cl.
CPC .......... *H04N 21/25808* (2013.01); *H04N 21/2407* (2013.01); *H04N 21/44224* (2020.08)

(58) Field of Classification Search
CPC ......... H04N 21/25808; H04N 21/2407; H04N 21/44224; H04N 21/44209
See application file for complete search history.

(56) References Cited

U.S. PATENT DOCUMENTS 5,741,892 A * 4/1998 Barlozzari .............. A61P 15/00
530/330
5,742,892 A * 4/1998 Chaddha .............. H04N 21/434
375/E7.277

(Continued)

FOREIGN PATENT DOCUMENTS

| RU | 2488969 | 7/2013 |
| RU | 2492588 | 9/2013 |
| RU | 2558736 | 8/2015 |

OTHER PUBLICATIONS

K. Yamagishi et al., "Parametric Quality-Estimation Model for Adaptive-Bitrate Streaming Services," IEEE Transactions on Multimedia, vol. 19, No. 7, pp. 1545-1557, 2017. DOI: 10.1109/TMM.2017.2669859.

(Continued)

*Primary Examiner* — Oschta I Montoya
(74) *Attorney, Agent, or Firm* — IPUSA, PLLC (57) ABSTRACT

An information processing apparatus including: an experience quality estimation unit that estimates an experience quality value by replacing a plurality of index values included in viewing history data of an image with an index value corresponding to a case other than any one of a plurality of predetermined bit rates; a contribution degree calculation unit that calculates a contribution degree of each bit rate included in the plurality of bit rates to an experience quality value on the basis of the estimated experience quality value; and a contribution degree output unit that outputs information indicating the contribution degree.

8 Claims, 6 Drawing Sheets

(56) References Cited

U.S. PATENT DOCUMENTS

| | | | |
|---|---|---|---|
| 10,085,015 B1* | 9/2018 | Westwater | G06T 7/0002 |
| 2004/0028003 A1* | 2/2004 | Diener | H04L 1/1664 |
| | | | 370/373 |
| 2005/0163059 A1* | 7/2005 | Dacosta | H04W 28/20 |
| | | | 370/278 |
| 2010/0029266 A1 | 2/2010 | van Gassel et al. | |
| 2010/0248643 A1 | 9/2010 | Aaron et al. | |
| 2012/0062791 A1 | 3/2012 | Thakolsri et al. | |
| 2013/0275615 A1 | 10/2013 | Oyman | |
| 2014/0280801 A1* | 9/2014 | Cardona | H04L 41/5025 |
| | | | 709/221 |
| 2018/0027293 A1* | 1/2018 | Yamamoto | H04L 65/612 |
| | | | 725/86 |

OTHER PUBLICATIONS

I. Mann et al., "Values of large games, IV: Evaluating the electoral college by Montecarlo techniques", Technical report, The RAND Corporation, Santa Monica, 1960.

Ahmed Jawwad et al: "Using Blackbox ML Techniques to Diagnose QoE Problems for an IPTV Service", NOMS 2020—2020 IEEE/IFIP Network Operations and Management Symposium, IEEE, Apr. 20, 2020 (Apr 20, 2020), pp. 1-8, XP033777685, DOI: 10.11019/NOMS47738.2020.9110375 [retrieved on Jun. 5, 2020].

Matsuo Yoichi et al: "Shapley-value-based Quality Degradation Analysis Method for Adaptive Bitrate Streaming Services", 2021 IEEE 23rd International Workshop on Multimedia Signal Proccessing (MMSP), IEEE, Oct. 6, 2021 (Oct. 6, 2021), pp. 1-6, XP034102740, DOI: 10.1109 / MMSP53017. 2021. 9733660 [retrieved on Mar. 11, 2022].

\* cited by examiner

INFORMATION PROCESSING APPARATUS, ANALYSIS METHOD AND PROGRAM

TECHNICAL FIELD

The present invention relates to an information processing apparatus, an analysis method, and a program.

BACKGROUND ART

Currently, various providers develop image distribution services. For each image distribution provider, it is important to keep the quality of an image felt by a user who views the image (hereinafter referred to as experience quality) as high as possible, improve the satisfaction level of the user, and cause the service to be continuously used. For this purpose, it is necessary to grasp the experience quality when each user views the image, and design or redesign an image distribution system.

However, it is not realistic for the image distribution provider to acquire the subjective experience quality of all users every time the image distribution is viewed. Therefore, an experience quality estimation model for estimating the experience quality from information of a distributed image has been proposed (Non Patent Literature 1).

In an image distribution method, a mechanism called adaptive bitrate (ABR) is generally used. The ABR includes a distribution server and a terminal. The image includes audio and video (image without audio). The video is divided in advance into data called a chunk of every several seconds, and each chunk is encoded at a plurality of bit rates in consideration of the resolution and the frame rate of the video and stored in the distribution server. The audio is also divided into chunks similar to the video, encoded at a plurality of bit rates, and stored in the distribution server. The image encoded under each condition is hereinafter referred to as a representation. The terminal repeats an operation of selecting an appropriate representation for each chunk on the basis of the communication status of the network and the status such as the reproduction buffer length, and requesting the distribution server for the selected image.

The experience quality estimation model estimates a value of the experience quality in a range of 1 to 5 on the basis of information such as a bit rate of the representation and a status of reproduction stop due to exhaustion of the reproduction buffer length. The image distribution provider monitors the distributed image on the basis of the estimated experience quality value, and designs and redesigns the distribution system according to the situation. For example, in a case where the experience quality value of the user has decreased, by changing the value or possibility of the bit rate at the time of encoding or changing the buffer length of the terminal, design or redesign can be performed so that the experience quality value of the user increases.

CITATION LIST

Non Patent Literature

Non Patent Literature 1: K. Yamagishi and T. Hayashi, "Parametric Quality-Estimation Model for Adaptive-Bitrate Streaming Services," IEEE Transactions on Multimedia, vol. 19, no. 7, pp. 1545-1557, 2017. DOI: 10.1109/TMM.2017.2669859.

SUMMARY OF INVENTION

Technical Problem

As described above, the image distribution provider performs design and redesign on the basis of the estimated experience quality value, but in the analysis method using the experience quality estimation model, various index values regarding to the distributed image are input, and estimation is performed using a complicated model, and thus when the estimated value of the experience quality decreases, it is not possible to know which bit rate causes deterioration in the experience quality. Therefore, it is difficult to perform design and redesign to improve the experience quality.

An object of the disclosed technology is to output information indicating a contribution degree to the experience quality of each bit rate for encoding an image.

Solution to Problem

The disclosed technology is an information processing apparatus including: an experience quality estimation unit that estimates an experience quality value by replacing a plurality of index values included in viewing history data of an image with an index value corresponding to a case other than any one of a plurality of predetermined bit rates; a contribution degree calculation unit that calculates a contribution degree of each bit rate included in the plurality of bit rates to an experience quality value on the basis of the estimated experience quality value; and a contribution degree output unit that outputs information indicating the contribution degree.

Advantageous Effects of Invention

It is possible to output information indicating a contribution degree to the experience quality of each bit rate for encoding an image.

DESCRIPTION OF EMBODIMENTS

First Embodiment

Hereinafter, the first embodiment of the present invention will be described with reference to the drawings. The embodiments described below are only examples, and embodiments to which the present invention is applied are not limited to the embodiments described below.

In the description below, reference documents are indicated as [1], [2], and the like. The names of the reference documents are described at the end of the specification.

The information processing device (information processing apparatus) according to the present embodiment calculates a contribution degree of each index value included in viewing history data with respect to the experience quality. The index value is a value serving as an index for estimating the experience quality of the viewed image, and a combination of a plurality of values may be used as one index value.

Figure 1:
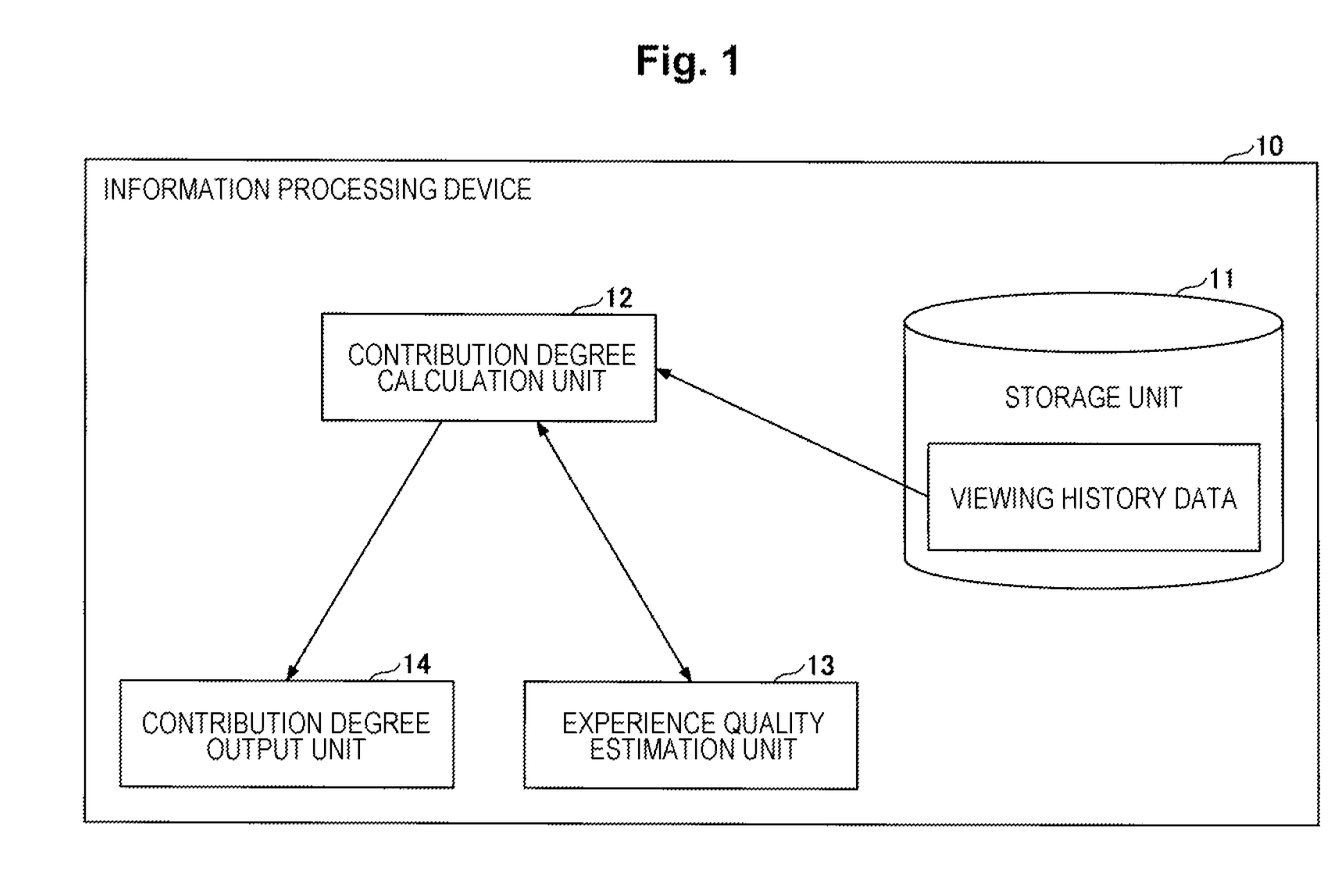
FIG. 1 is a functional configuration diagram of an information processing device according to a first embodiment.

FIG. 1 is a functional configuration diagram of an information processing device (information processing apparatus) according to the first embodiment. An information processing device 10 (information processing apparatus) includes a storage unit 11, a contribution degree calculation unit 12, an experience quality estimation unit 13, and a contribution degree output unit 14.

The storage unit 11 stores various data, specifically, stores viewing history data. The viewing history data is data indicating a history of viewing an image by the user.

The contribution degree calculation unit 12 calculates the contribution degree of each index value included in the viewing history data. Specifically, the contribution degree calculation unit 12 treats each index value as a player in the cooperative game theory, and acquires an experience quality value for each combination of participation and non-participation of each index value in the game from the experience quality estimation unit 13.

Then, the contribution degree calculation unit 12 calculates a shapley value of each index value as a contribution degree from the acquired experience quality value for each combination.

Note that, in the theory of cooperative game, the shapley value is one of fair reward calculation methods for calculating a reasonable reward according to the importance of each player with respect to the overall work in a case where the players participating in the game cooperate with each other and a situation in which the acquired reward is distributed occurs [2]. In the following, the experience quality estimation unit 13 estimates an experience quality value by executing processing defined in the experience quality estimation model. The experience quality estimation model is, for example, a model proposed in [1]. It is assumed that the estimated experience quality value is represented by $QoE_{est}$. In addition, the estimated experience quality value takes a value from 1 to 5.

The contribution degree output unit 14 outputs the Shapley value of each index value calculated by the contribution degree calculation unit 12 as a contribution degree.

Figure 2:
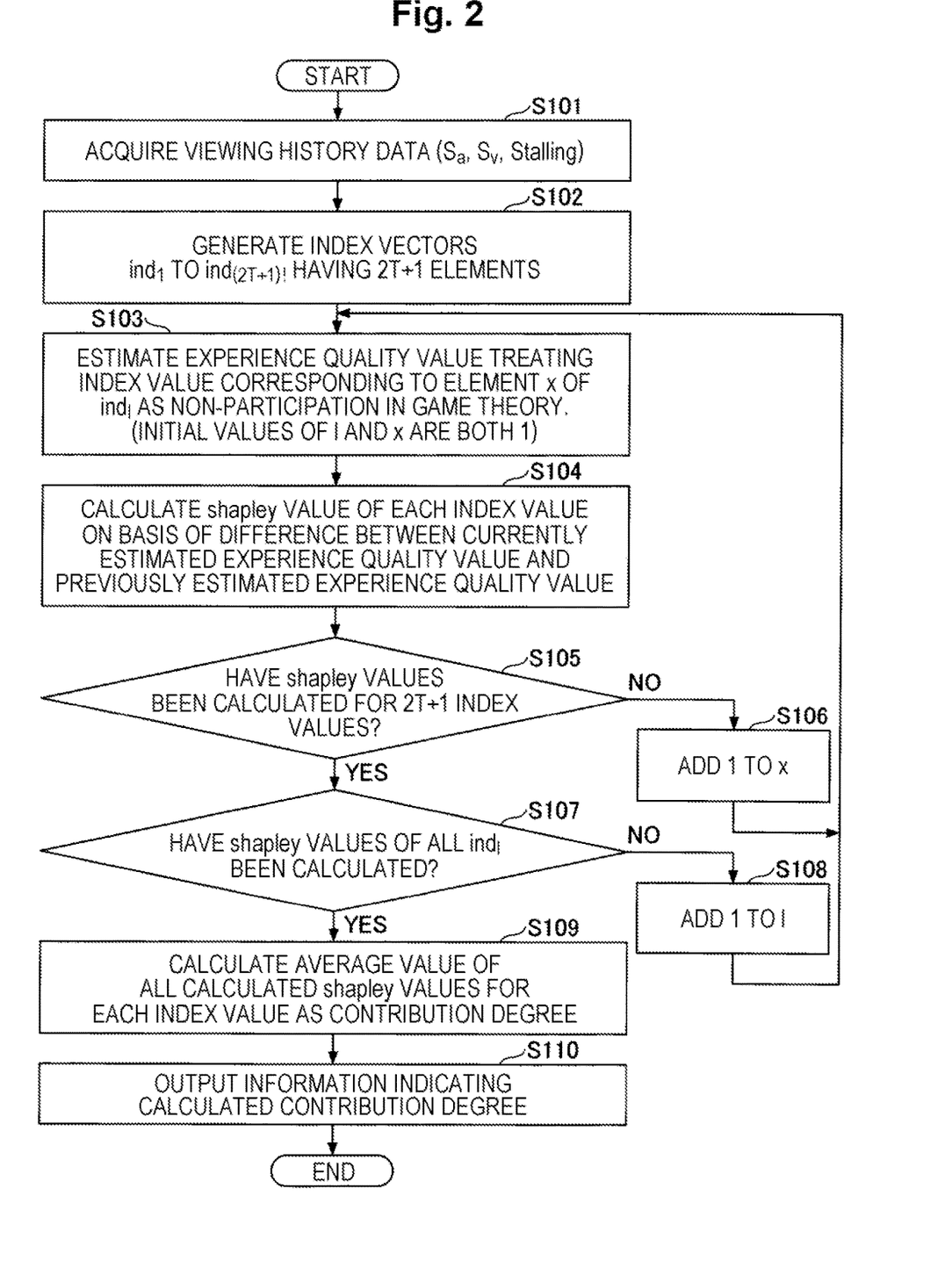
FIG. 2 is a flowchart illustrating an example of a flow of contribution degree calculation processing according to the first embodiment.

FIG. 2 is a flowchart illustrating an example of a flow of contribution degree calculation processing according to the first embodiment. The contribution degree calculation unit 12 acquires the viewing history data (step S101). Here, viewing history data and an image to be viewed will be described.

The image includes audio and video (image without audio), and bit rates used for encoding are $$b_1^a, \ldots, b_{B_a}^a \quad \text{[Math. 1]}$$

(audio) and $$b_1^v, \ldots, b_{B_v}^v \quad \text{[Math. 2]}$$

(video).

Here, $B_a$ and $B_7$ are the number of types of bit rates of audio and video, respectively, and $b_1^a$ and $b_1^v$ are minimum bit rates, and $$b_{B_a}^a, b_{B_v}^v \quad \text{[Math. 3]}$$

is a maximum bit rate. For example, in a case where there are three types of audio bit rates of 48 bps, 64 bps, and 96 bps used for encoding, $b_1^a=48$, $b_2^a=64$, $b_3^a=96$, and $B_a=3$.

Regarding the video, bit rates are prepared according to resolution and frame rate. For example, in a case where a total of six types of videos including a frame rate of 30 fps and resolutions of 240 p, 360 p, 480 p, 780 p, and 1080 p, and a frame rate of 60 fps and a resolution of 1080 p are prepared, video bit rates used for encoding are 253 kbps, 501 kbps, 961 kbps, 1771 kbps, 3436 kbps, 6000 kbps, and the like in order, and $b_1^v=253, \ldots, b_6^v=6000$, and $B_v=6$.

In addition, regarding image data, the representations obtained by encoding a chunk $c_t$ at time t at bit rates $b_i^a$ and $b_i^v$, respectively, are as described below.

$$R_{t,b_i^a}, R_{t,b_i^v}. \quad \text{[Math. 4]}$$

Then, when a certain user views the image, the sequence of the representations selected by the ABR is $$S_a = [s_1^a, s_2^a, \ldots, s_T^a], s_t^a \in R_{t,b_i^a}, \text{ and} \quad \text{[Math. 5]}$$

$$S_v = [s_1^v, s_2^v, \ldots, s_T^v], s_t^a \in R_{t,b_i^v}. \quad \text{[Math. 6]}$$

Here, T is a time indicating the length of the image data.

In addition, the occurrence of reproduction stop during viewing and reproduction stop time are expressed as described below.

$$\text{stalling}=[\text{num}_{stall}, \text{start}_1, \text{end}_1, \ldots, \text{start}_{num_{stall}}, \text{end}_{num_{stall}}] \quad \text{[Math. 7]}$$

Here, $\text{num}_{stall}$ is the number of times the reproduction stop has occurred, and $\text{start}_k$ and $\text{end}_k$ are the time when the reproduction stop has occurred and the time when the reproduction stop has ended, respectively. Note that when $\text{num}_{stall}=0$, stalling=[0]. However, the notation is not limited to the above, and any format may be used as long as the number of times of occurrence can be counted.

The viewing history data acquired in step S101 includes $S_a$, $S_v$, and stalling as index values.

Next, the contribution degree calculation unit 12 generates index vectors $\text{ind}_1$ to $\text{ind}_{(2T+1)!}$ having 2T+1 elements (step S102). Specifically, the contribution degree calculation unit 12 rearranges elements of the (2T+1)-dimensional index vectors $\text{ind}_{origin}=[1, 2, \ldots, 2T+1]$ in the designated order to set $\text{ind}_1$.

For example, $\text{ind}_1$ in a case where the contribution degree calculation unit 12 designates 3, 2, 1, 4, 5, ..., 2T+1 in this order is [3, 2, 1, 4, 5, ..., 2T+1]. The contribution degree calculation unit 12 generates (2T+1)!, which is all patterns that can cover the above, i.e., $\text{ind}_1$ to $\text{ind}_{(2T+1)!}$.

In addition, the contribution degree calculation unit 12 generates 2T+1-dimensional vector shap=[0, 0, ..., 0] for storing the shapley value.

Subsequently, the experience quality estimation unit 13 estimates an experience quality value in which the index value corresponding to an element x of $\text{ind}_1$ is treated as non-participation in the game theory (step S103). Note that the initial values of 1 and x are both 1. Here, it is assumed that a first element to a T-th element of the vector $ind_1$ correspond to a first element to a T-th element of $S_a$, a T+1-th element to a second T-th element of the vector $ind_1$ correspond to a first element to a T-th element of $S_v$, and a second T+1-th element of the vector $ind_1$ corresponds to stalling.

In addition, the non-participation in the game indicates that each element of $S_a$ and $S_v$ is replaced with a provisional value in a case where the minimum bit rate is selected. In addition, it indicates that stalling is replaced with a provisional value in a case where reproduction stop does not occur, that is, $num_{stall}$=0.

Specifically, the experience quality estimation unit 13 estimates in advance experience quality value $QoE_{est}$ in the actual viewing history data ($S_a$, $S_v$, and stalling). Then, the experience quality estimation unit 13 estimates an experience quality value $QoE_{1,1}$ with the experience quality estimation model by replacing with the provisional value in a case where $s_t^a$, $s_t^v$, or stalling corresponding to an element i in which the element of $ind_1$ is 1 does not participate.

Subsequently, the contribution degree calculation unit 12 calculates a shapley value of each index value on the basis of a difference between the currently estimated experience quality value and the previously estimated experience quality value (step S104). Specifically, the contribution degree calculation unit 12 calculates the shapley value using Formula (1) described below.

$$shap[i]=QoE_{est}-QoE_{1,1}+shap[i] \quad (1)$$

Then, the contribution degree calculation unit 12 determines whether or not a shapley value has been calculated for 2T+1 index values (step S105). When determining that the shapley values have not been calculated for 2T+1 index values (step S105: No), the contribution degree calculation unit 12 adds 1 to x (step S106), and returns to the processing of step S103.

Note that, in step S104, in a case where x is 2 or more, the contribution degree calculation unit 12 calculates a shapley value using Formula (2) described below.

$$shap[i]=QoE_{1,x-1}-QoE_{1,x}+shap[i] \quad (2)$$

When determining that the shapley values have been calculated for the 2T+1 index values (step S105: Yes), the contribution degree calculation unit 12 determines whether or not the shapley values of all $ind_1$ have been calculated (step S107). When determining that there is $ind_1$ for which the shapley value has not been calculated (step S107: No), the contribution degree calculation unit 12 adds 1 to l (step S108), and returns to the processing of step S103.

When determining that the shapley values of all the $ind_1$ have been calculated (step S107: Yes), the contribution degree calculation unit 12 calculates an average value of all the calculated shapley values for each index value as the contribution degree (step S109). Specifically, the contribution degree calculation unit 12 calculates an average value of the shapley values of the index values by dividing the shapley value of each index value added by Formula (1) or (2) by 2T+1.

The contribution degree output unit 14 outputs information indicating the calculated contribution degree (step S110).

(Specific Example)

A specific example of calculation in each processing described above will be described. It is assumed that those described below are prepared as the audio bit rate and the video bit rate, and there is an image encoded using them.

$b_1^a$=48,$b_2^a$=64,$b_3^a$=96,$b_1^v$114,$b_2^v$=253,$b_3^v$=501, $b_4^v$=961, and $b_5^v$=1771

In addition, the viewing history data is as described below.

$S_a$=[96,96,96,96,96],$S_v$=[501,501,114,253,961],stalling=[1,1,5]

When the experience quality estimation unit 13 calculates the experience quality value $QoE_{est}$ in the viewing history data ($S_a$, $S_v$, stalling) using the calculation formula described in [1], $QoE_{est}$=3.06 is obtained.

The contribution degree calculation unit 12 generates the vectors described below.

$ind_{origin}$=[1,2,3,4,5,6,7,8,9,10,11],shap=[0,0,0,0,0,0,0, 0,0,0,0]

The contribution degree calculation unit 12 generates 11! $ind_1$ of different order as descried below.

$ind_1$=[2,1,3,4,5,6,7,8,9,10,11],$ind_1$=[3,2,1,4,5,6,7,8,9, 10,11],

When the experience quality estimation unit 13 calculates $QoE_{1,1}$ when $S_2^a$ corresponding to the element set to 1 in $ind_1$ does not participate, that is, on the basis of $S_a$=[96, 48, 96, 96, 96], replaced with 48, $S_v$=[501, 501, 114, 253, 961], and stalling=[1, 1, 5], $QoE_{1,1}$=3.02 is obtained.

The contribution degree calculation unit 12 performs addition to the second element of the shap by calculation according to Formula (1).

shap[2]=3.06($QoE_{est}$)−3.02($QoE_{1,1}$)+0(shap[2])=0.04

When the experience quality estimation unit 13 calculates $QoE_{1,2}$ when $S_1^a$ corresponding to the element set to 2 in $ind_1$ does not participate, that is, on the basis of $S_a$=[48, 48, 96, 96, 96], replaced with 48, $S_v$=[501, 501, 114, 253, 961], and stalling=[1, 1, 5], $QoE_{1,2}$=3.00 is obtained.

The contribution degree calculation unit 12 performs addition to the first element of the shap by calculation according to Formula (1).

shap[1]=3.02($QoE_{1,1}$)−3.00($QoE_{1,2}$)+0(shap[1])=0.02

In this manner, the contribution degree calculation unit 12 executes calculation for $ind_1$.

Subsequently, when the experience quality estimation unit 13 calculates $QoE_{2,1}$ when $S_3^a$ corresponding to the element set to 1 in $ind_2$ does not participate, that is, on the basis of $S_a$=[96, 96, 48, 96, 96], replaced with 48, $S_v$=[501, 501, 114, 253, 961], and stalling=[1, 1, 5], $QoE_{2,1}$=3.01 is obtained.

The contribution degree calculation unit 12 performs addition to the third element of the shap by calculation according to Formula (1).

shap[3]=3.06($QoE_{est}$)−3.01($QoE_{2,1}$)+0.04(shap[3])= 0.09

In this manner, the contribution degree calculation unit 12 executes calculation for $ind_2$.

The contribution degree calculation unit 12 and the experience quality estimation unit 13 repeat such calculations, and performs calculation for 11! $ind_1$. Then, the contribution degree calculation unit 12 sets a value obtained by dividing each element of shap by 11!(=39916800) to a contribution degree of each index value. For example, when the first element of shap is 1500000, about 0.0375, a value obtained by dividing by 11!, is a contribution degree of $S_1^a$.

The information processing device according to the present embodiment outputs information indicating the contribution degree of each index value included in the viewing history data with respect to the experience quality by applying the cooperative game theory. Thus, it is possible to grasp how much each index value affects the experience quality, and to use it as a reference for designing and redesigning the image distribution system.

In addition, in the present embodiment, an example has been described in which non-participation in the game of the cooperative game theory indicates that each element of $S_a$ and $S_v$ is replaced with a provisional value in a case where the minimum bit rate is selected. However, the provisional values may be different. For example, they may be replaced with provisional values in a case where the maximum bit rate is selected.

Specifically, in the processing of step S103 of the contribution degree calculation processing illustrated in FIG. 2, the experience quality estimation unit 13 estimates an experience quality value by replacing the index value corresponding to the element x of $ind_1$ with a provisional value indicating non-participation in the game theory. Here, non-participation in the game indicates that each element of $S_a$ and $S_v$ is replaced with a provisional value in a case where the maximum bit rate is selected. In addition, it indicates that stalling is replaced with a provisional value in a case where reproduction stop does not occur, that is, $num_{stall}=0$.

In this way, the output shapley values are all zero or less, and the difference from the highest state (when the highest bit rate is selected and the reproduction is not stopped) is calculated, so that it can be understood how much each index value lowers the experience quality as compared with the highest state.

Second Embodiment

Hereinafter, the second embodiment will be described with reference to the drawings. The second embodiment is different from the first embodiment in that, instead of each element of $S_a$ or $S_v$ as an index value, each element of an audio bit rate and a video bit rate is used as an index value. Therefore, in the description of the second embodiment below, the differences from the first embodiment will be mainly described, and those having functional configurations similar to those of the first embodiment are denoted by the same reference numerals as those used in the description of the first embodiment, and the description thereof will be omitted.

Figure 3:
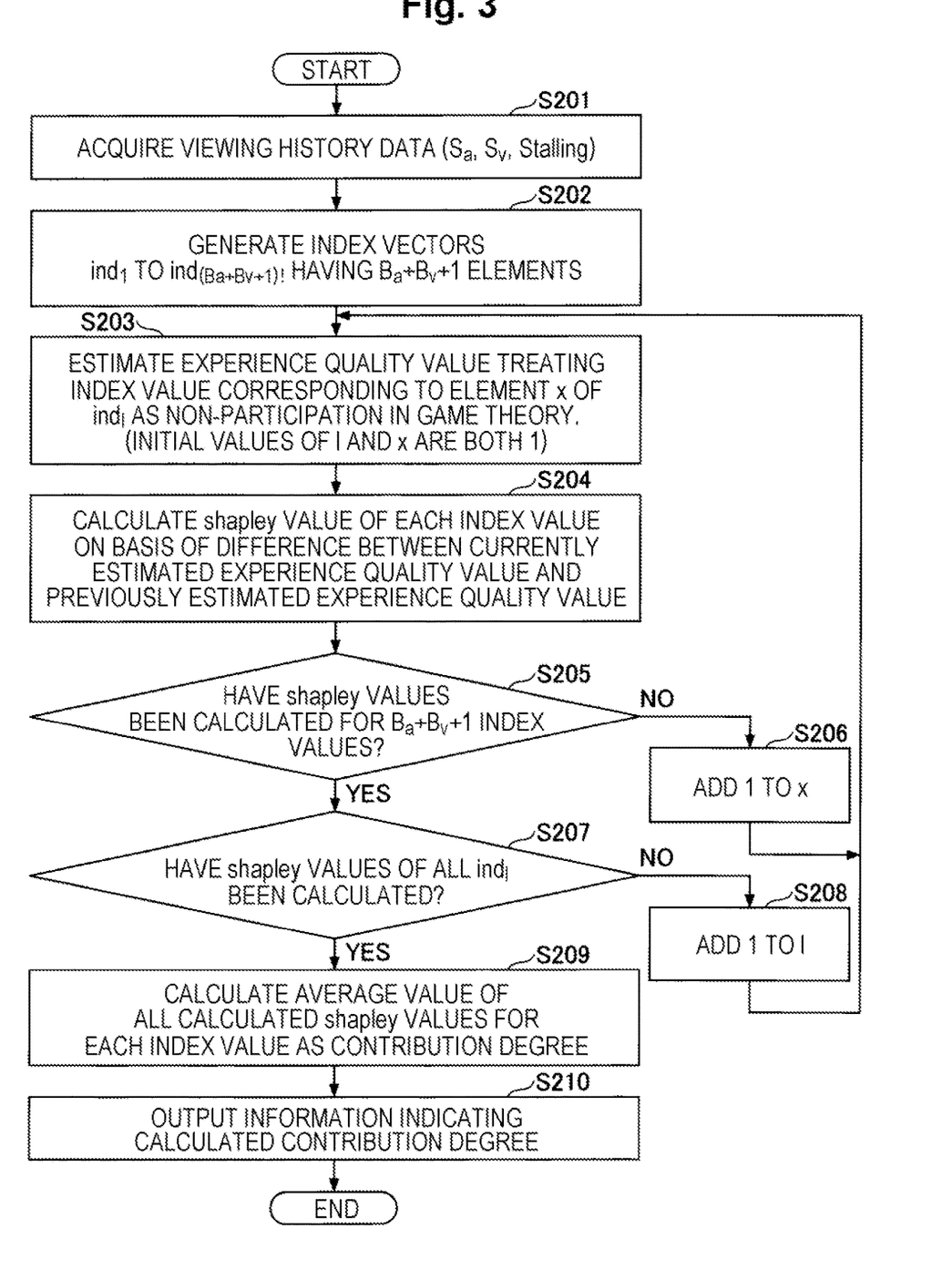
FIG. 3 is a flowchart illustrating an example of a flow of contribution degree calculation processing according to a second embodiment.

The experience quality estimation unit 13 according to the present embodiment estimates the experience quality value by replacing the plurality of index values included in the viewing history data of the image with the index value corresponding to a case other than any one of the plurality of predetermined bit rates.

FIG. 3 is a flowchart illustrating an example of a flow of contribution degree calculation processing according to the second embodiment. The processing of step S201 of the contribution degree calculation processing according to the present embodiment is similar to the processing of step S101 of the contribution degree calculation processing according to the first embodiment.

Subsequent to step S201, the contribution degree calculation unit 12 generates index vectors $ind_1$ to $ind_{(Ba+Bv+1)!}$ having $B_a+B_v+1$ elements (step S202). Specifically, the contribution degree calculation unit 12 rearranges elements of the $(B_a+B_v+1)$-dimensional index vectors $ind_{origin}=[1, 2, \ldots, B_a+B_v+1]$ in the designated order to set $ind_1$.

For example, $ind_1$ in a case where the contribution degree calculation unit 12 designates 3, 2, 1, 4, 5, ..., $B_a+B_v+1$ in this order is [3, 2, 1, 4, 5, ..., $B_a+B_v+1$]. The contribution degree calculation unit 12 generates $(B_a+B_v+1)!$, which is all patterns that can cover the above, i.e., $ind_1$ to $ind_{(Ba+Bv+1)!}$.

In addition, the contribution degree calculation unit 12 generates $B_a+B_v+1$-dimensional vector shap=[0, 0, ..., 0] for storing the shapley value.

Subsequently, the experience quality estimation unit 13 estimates an experience quality value in which the index value corresponding to the element x of $ind_1$ is treated as non-participation in the game theory (step S203). Note that the initial values of 1 and x are both 1. Here, it is assumed that a first element to a $B_a$-th element of the vector $ind_1$ correspond to a first element to a $B_a$-th element of audio bit rate, a $B_a+1$-th element to a $B_a+B_v$-th element of the vector $ind_1$ correspond to a first element to a $B_v$-th element of video bit rate, and a $B_a+B_v+1$-th element of the vector $ind_1$ corresponds to stalling.

In addition, regarding non-participation in the game, for each element of the audio bit rate and the video bit rate, it is assumed that the bit rate of the element of non-participation for all representations is not selected, and regarding stalling, it is assumed that no reproduction stop has occurred, that is, $num_{stall}=0$. Note that the case where the bit rate of the element of non-participation is not selected means replacing the bit rate of the element of non-participation with a provisional value in a case where the lowest possible bit rate is selected.

Specifically, the experience quality estimation unit 13 estimates in advance experience quality value $QoE_{est}$ in the actual viewing history data ($S_a$, $S_v$, and stalling). Then, the experience quality estimation unit 13 estimates an experience quality value $QoE_{1,1}$ with the experience quality estimation model by replacing in a case where $b_i^a$, $b_i^v$, or stalling corresponding to the element i in which the element of $ind_1$ is 1 does not participate.

For example, assuming that the index value corresponding to the element i in which the element of $ind_1$ is 1 is $b_i^a$ or $b_i^v$, the representation encoded at the bit rate corresponding to the element i $$s_j^a = \{s_j^a \mid s_j^a \in R_{t,b_i^a}\} \text{ or} \qquad \text{[Math. 8]}$$

$$s_j^v = \{s_j^v \mid s_j^v \in R_{t,b_i^v}\} \qquad \text{[Math. 9]}$$

is extracted. Then, the experience quality estimation unit 13 calculates the experience quality value $QoE_{1,1}$ by replacing the extracted $S_j^a$ and $S_j^v$ in the case of non-participation.

Subsequently, the contribution degree calculation unit 12 calculates a shapley value of each index value on the basis of a difference between the currently estimated experience quality value and the previously estimated experience quality value (step S204). Specifically, the contribution degree calculation unit 12 calculates the shapley value using Formula (1) described below.

$$\text{shap}[i]=QoE_{est}-QoE_{1,1}+\text{shap}[i] \qquad (1)$$

Then, the contribution degree calculation unit 12 determines whether or not a shapley value has been calculated for $B_a+B_v+1$ index values (step S205). When determining that the shapley values have not been calculated for $B_a+B_v+1$ index values (step S205: No), the contribution degree calculation unit 12 adds 1 to x (step S206), and returns to the processing of step S203.

Note that, in step S204, in a case where x is 2 or more, the contribution degree calculation unit 12 calculates a shapley value using Formula (2) described below.

$$\text{shap}[i]=QoE_{1,x-1}-QoE_{1,x}+\text{shap}[i] \qquad (2)$$

When determining that the shapley values have been calculated for the $B_a+B_v+1$ index values (step S205: Yes), the contribution degree calculation unit 12 determines whether or not the shapley values of all $ind_1$ have been calculated (step S207). When determining that there is $ind_1$ for which the shapley value has not been calculated (step S207: No), the contribution degree calculation unit 12 adds 1 to l (step S208), and returns to the processing of step S203.

When determining that the shapley values of all the $ind_1$ have been calculated (step S207: Yes), the contribution degree calculation unit 12 calculates an average value of all the calculated shapley values for each index value as the contribution degree (step S209). Specifically, the contribution degree calculation unit 12 calculates an average value of the shapley values of the index values by dividing the shapley value of each index value added by Formula (1) or (2) by $B_a+B_v+1$.

The contribution degree output unit 14 outputs information indicating the calculated contribution degree (step S210).

(Specific Example)

A specific example of calculation in each processing described above will be described. It is assumed that those described below are prepared as the audio bit rate and the video bit rate, and there is an image encoded using them.

$$b_1^a=48, b_2^a=64, b_3^a=96, b_1^v=114, b_2^v=253, b_3^v=501,$$
$$b_4^v=961, \text{ and } b_5^v=1771$$

In addition, the viewing history data is as described below.

$$S_a=[96,96,96,96,96], S_v=[501,501,114,253,961], \text{stalling}=[1,1,5]$$

When the experience quality estimation unit 13 calculates the experience quality value $QoE_{est}$ in the viewing history data ($S_a$, $S_v$, stalling) using the calculation formula described in [1], $QoE_{est}=3.06$ is obtained.

The contribution degree calculation unit 12 generates the vectors described below.

$$ind_{origin}=[1,2,3,4,5,6,7,8,9], \text{ and shap}=[0,0,0,0,0,0,0,0,0]$$

The contribution degree calculation unit 12 generates 9! $ind_1$ of different order as descried below.

$$ind_1=[3,2,1,4,5,6,7,8,9], ind_2=[2,3,4,5,6,1,7,8,9],$$

When the experience quality estimation unit 13 calculates $QoE_{1,1}$ when $b_3^a=96$ corresponding to the element set to 1 in $ind_1$ does not participate, that is, on the basis of $S_a=[48, 48, 48, 48, 48]$, replaced with 48, $S_v=[501, 501, 114, 253, 961]$, and stalling=[1, 1, 5], $QoE_{1,1}=2.80$ is obtained.

The contribution degree calculation unit 12 performs addition to the third element of the shap by calculation according to Formula (1).

$$shap[3]=3.06(QoE_{est})-2.80(QoE_{1,1})+0(shap[3])=0.26$$

When the experience quality estimation unit 13 calculates $QoE_{1,2}$ when $b_2^a=64$ corresponding to the element set to 2 in $ind_1$ does not participate, that is, on the basis of $S_a=[48, 48, 48, 48, 48]$, replaced with 48, $S_v=[501, 501, 114, 253, 961]$, and stalling=[1,1,5], $QoE_{1,2}=2.80$ is obtained. Note that, here, since $S_a$ originally does not include 64, the experience quality estimation unit 13 does not substantially perform replacement.

The contribution degree calculation unit 12 performs addition to the second element of the shap by calculation according to Formula (1).

$$shap[2]=2.80(QoE_{1,1})-2.80(QoE_{1,2})+0(shap[2])=0.00$$

In this manner, the contribution degree calculation unit 12 executes calculation for $ind_1$.

Subsequently, when the experience quality estimation unit 13 calculates $QoE_{2,1}$ when $b_3^v=501$ corresponding to the element set to 1 in $ind_2$ does not participate, that is, on the basis of $S_a=[96, 96, 96, 96, 96]$, $S_v=[114, 114, 114, 253, 961]$, replaced with 114, and stalling=[1, 1, 5], $QoE_{2,1}=2.50$ is obtained.

The contribution degree calculation unit 12 performs addition to a sixth element of the shap by calculation according to Formula (1).

$$shap[6]=3.06(QoE_{est})-2.50(QoE_{2,1})+0.44(shap[6])=1.00$$

In this manner, the contribution degree calculation unit 12 executes calculation for $ind_2$.

The contribution degree calculation unit 12 and the experience quality estimation unit 13 repeat such calculations, and performs calculation for 9! $ind_1$. Then, the contribution degree calculation unit 12 sets a value obtained by dividing each element of shap by 9!(=362880) to a contribution degree of each index value. For example, when the first element of shap is 15000, about 0.0413, a value obtained by dividing by 9!, is a contribution degree of $b_1^a$.

With the information processing device 10 according to the present embodiment, in the method for calculating the contribution degree according to the first embodiment, the calculation amount becomes enormous in a case where the viewing time is long, and the calculation may not be completed in a realistic time. On the other hand, with the information processing device 10 of the present embodiment, by calculating the contribution degree using a plurality of predetermined bit rates as index values, it is possible to suppress the calculation amount and to perform calculation within a realistic time even in a case where the viewing time is long.

In addition, in the present embodiment, an example has been described in which non-participation in the game of the cooperative game theory indicates that each element of the audio bit rate and the video bit rate is replaced with a provisional value in a case where the bit rate of the element of non-participation for all representations is not selected. Then, the case where the bit rate of the element of non-participation is not selected means replacing the bit rate of the element of non-participation with a provisional value in a case where the lowest possible bit rate is selected.

However, the provisional values may be different. For example, the case where the bit rate of the element of non-participation is not selected may mean replacing the bit rate of the element of non-participation with a provisional value in a case where the highest possible bit rate is selected.

Specifically, in the processing of step S203 of the contribution degree calculation processing illustrated in FIG. 3, the experience quality estimation unit 13 estimates an experience quality value by replacing the index value corresponding to the element x of $ind_1$ with a provisional value indicating non-participation in the game theory. Here, non-participation in the game indicates that, for each element of the audio bit rate and the video bit rate, the bit rate of the element of non-participation for all representations is not selected, and it is replaced with a provisional value in a case where the highest possible bit rate is selected. In addition, it indicates that stalling is replaced with a provisional value in a case where reproduction stop does not occur, that is, $num_{stall}=0$.

In this way, the output shapley values are all zero or less, and the difference from the highest state (when the highest bit rate is selected and the reproduction is not stopped) is calculated, so that it can be understood how much each index value lowers the experience quality as compared with the highest state.

Third Embodiment

Hereinafter, the third embodiment will be described with reference to the drawings. The third embodiment is different from the second embodiment in that, instead of each element of $S_a$ or $S_v$ as an index value, a short-time experience quality value at each time calculated on the basis of $S_a$ and $S_v$ is used as an index value. Therefore, in the description of the third embodiment below, the differences from the second embodiment will be mainly described, and those having functional configurations similar to those of the second embodiment are denoted by the same reference numerals as those used in the description of the second embodiment, and the description thereof will be omitted.

Figure 4:
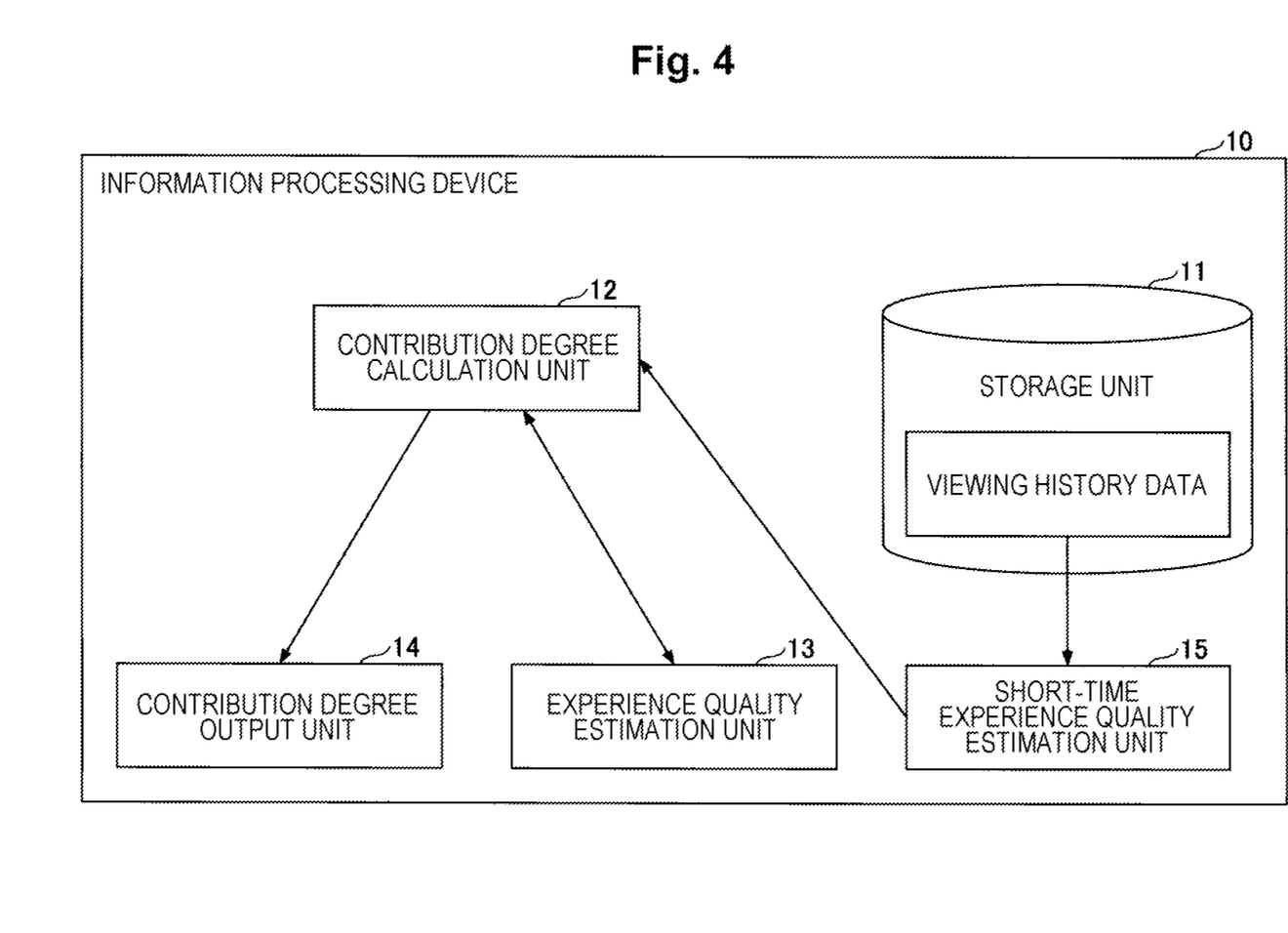
FIG. 4 is a functional configuration diagram of an information processing device according to a third embodiment.

FIG. 4 is a functional configuration diagram of an information processing device according to the third embodiment. The information processing device 10 according to the present embodiment further includes a short-time experience quality estimation unit 15 in addition to the information processing device 10 according to the second embodiment.

The short-time experience quality estimation unit 15 executes processing defined in the experience quality estimation model, and estimates short-time experience quality values $q_t^a$ and $q_t^v$ at each time on the basis of respective elements $s_t^a$ and $s_t^v$ of $S_a$ and $S_v$ [1].

Figure 5:
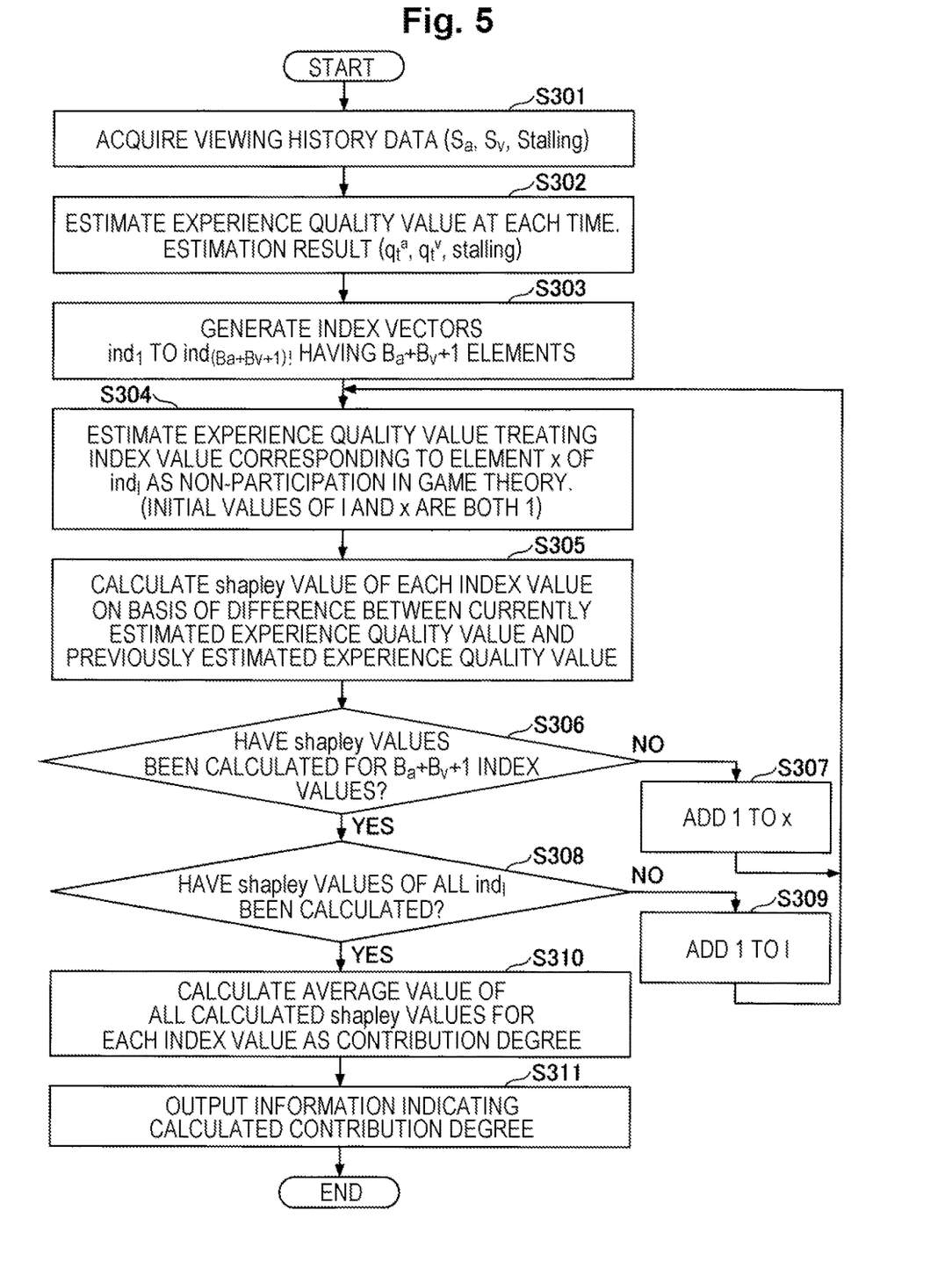
FIG. 5 is a flowchart illustrating an example of a flow of contribution degree calculation processing according to the third embodiment.
Figure 6:
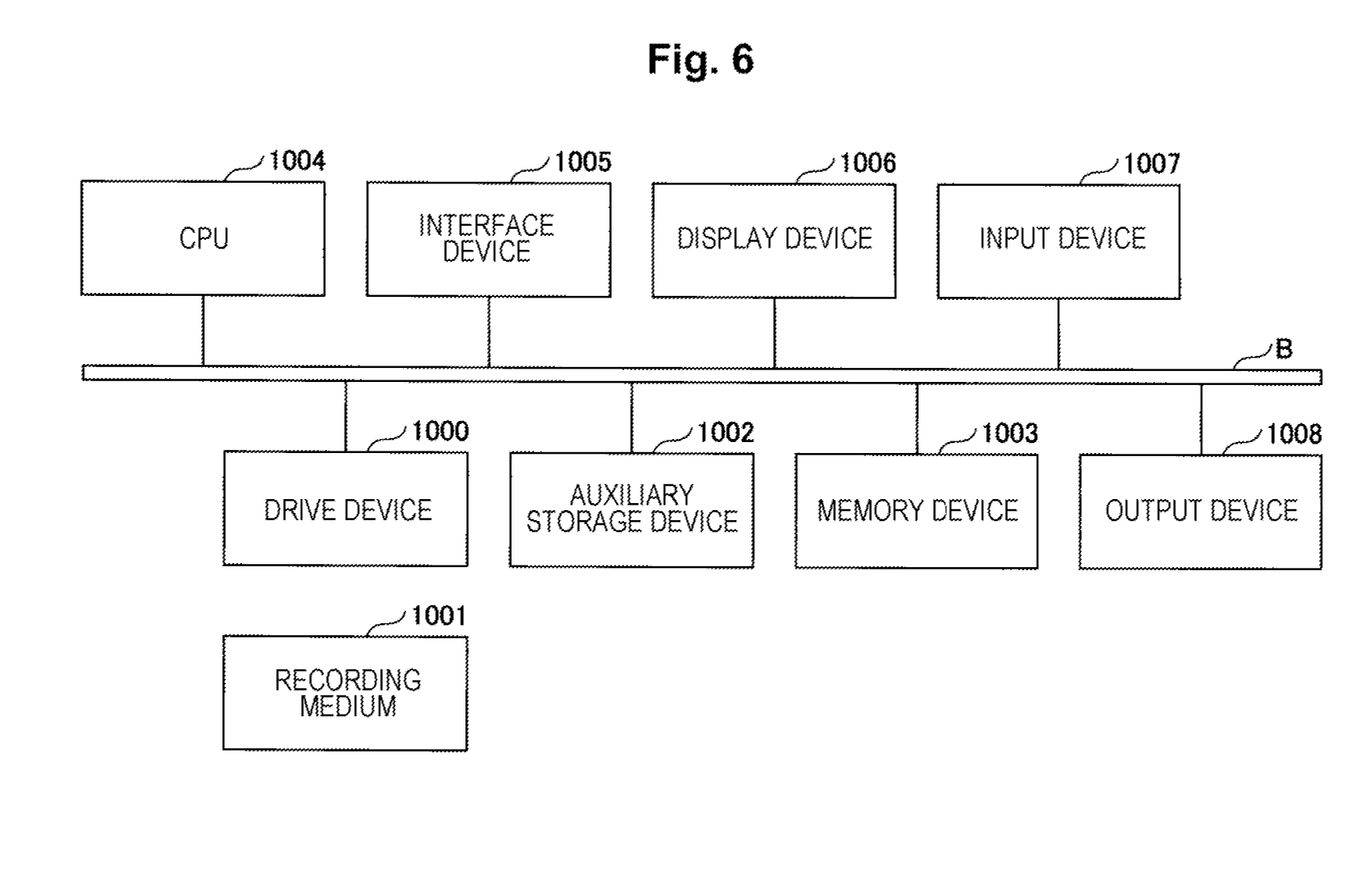
FIG. 6 is a diagram illustrating a hardware configuration example of the information processing device.

FIG. 5 is a flowchart illustrating an example of a flow of contribution degree calculation processing according to the third embodiment. The processing of step S301 of the contribution degree calculation processing according to the present embodiment is similar to the processing of step S201 of the contribution degree calculation processing according to the second embodiment.

Subsequent to step S301, the short-time experience quality estimation unit 15 estimates a short-time experience quality value at each time (step S302). The estimation result includes $q_t^a$, $q_t^v$, and stalling as index values. Note that $q_t^a$ and $q_t^v$ are values obtained by estimating a short-time experience quality value at each time on the basis of $s_t^a$ and $s_t^v$, respectively. Moreover, the short-time experience quality estimation unit 15 calculates short-time experience quality values with respect to the representations encoded at certain bit rate $b'^a_i$ and $b'^v_i$ $$q_j^a = \{q_j^a \mid s_j^a \in R_{t,b_i^a}\}, \text{ and} \quad \text{[Math. 10]}$$

$$q_j^v = \{q_j^v \mid s_j^v \in R_{t,b_i^v}\}. \quad \text{[Math. 11]}$$

Since $q_t^a$ and $q_t^v$ take a value from 1 to 5, the case of 1, which is the lowest short-time experience quality value, is considered as non-participation. In addition, the experience quality estimation unit 13 estimates an experience quality value $QoE_{est}$ on the basis of $q_t^a$ and $q_t^v$ in advance [1].

The processing of steps S303 to S311 of the contribution degree calculation processing according to the present embodiment is similar to the processing of steps S202 to S210 of the contribution degree calculation processing according to the first embodiment except that the index values are $q_t^a$, $q_t^v$, and stalling.

With the information processing device 10 of the present embodiment, it is possible to output the information indicating the contribution degree in which the estimated value of the short-time experience quality value is used as the index value. Thus, the influence of the short-time experience quality value on the overall experience quality value can be grasped and used as a reference for designing and redesigning the image distribution system.

In addition, in the present embodiment, an example has been described in which non-participation in the game in the cooperative game theory indicates that $q_t^a$ and $q_t^v$ are both replaced with provisional values in the case of 1, which is the lowest short-time experience quality value. However, the provisional values may be different. For example, $q_t^a$ and $q_t^v$ may be both replaced with provisional values in the case of 5, which is the highest short-time experience quality value.

Specifically, in the processing of step S303 of the contribution degree calculation processing illustrated in FIG. 4, the experience quality estimation unit 13 estimates an experience quality value by replacing the index value corresponding to the element x of $ind_1$ with a provisional value indicating non-participation in the game theory. Here, non-participation in the game indicates that $q_t^a$ and $q_t^v$ are both replaced with provisional values in the case of 5, which is the highest short-time experience quality value. In addition, it indicates that stalling is replaced with a provisional value in a case where reproduction stop does not occur, that is, $num_{stall}=0$.

In this way, the output shapley values are all zero or less, and the difference from the highest state (the highest short-time experience quality value and no reproduction stop) is calculated, so that it can be understood how much each index value lowers the experience quality as compared with the highest state.

(Hardware Configuration Example According to Each Embodiment)

The information processing device 10 can be implemented, for example, by a computer executing a program in which processing contents described in the present embodiments are described. Note that the "computer" may be a physical machine or a virtual machine on a cloud. In a case where a virtual machine is used, "hardware" described herein is virtual hardware.

The above program can be stored and distributed by being recorded in a computer-readable recording medium (portable memory or the like). In addition, the above program can also be provided through a network such as the Internet or e-mail.

FIG. 5 is a diagram illustrating a hardware configuration example of the computer. The computer in FIG. 5 includes a drive device 1000, an auxiliary storage device 1002, a memory device 1003, a CPU 1004, an interface device 1005, a display device 1006, an input device 1007, an output device 1008, and the like which are connected to each other by a bus B.

The program for realizing the processing in the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. However, the program is not necessarily installed from the recording medium 1001, and may be downloaded from another computer via a network. The auxiliary storage device 1002 stores the installed program and also stores necessary files, data, and the like.

In a case where an instruction to start the program is made, the memory device 1003 reads and stores the program from the auxiliary storage device 1002. The CPU 1004 implements a function related to the device in accordance with a program stored in the memory device 1003. The interface device 1005 is used as an interface for connecting to the network. The display device 1006 displays a graphical user interface (GUI) or the like by the program. The input device 1007 includes a keyboard and mouse, buttons, a touch panel, or the like, and is used to input various operation instructions. The output device 1008 outputs a computation result.

(Reference Document)

[1] K. Yamagishi and T. Hayashi, "Parametric Quality-Estimation Model for Adaptive-Bitrate Streaming Services," IEEE Transactions on Multimedia, vol. 19, no. 7, pp. 1545-1557, 2017. DOI: 10.1109/TMM.2017.2669859. (Non Patent Literature 1)

[2] I. Mann, L. S. Shapley, Values for large games IV: Evaluating the electoral college by Monte Carlo techniques, Technical report, The RAND Corporation, Santa Monica, 1960.

Summary of Embodiments

In the present specification, at least the information processing device, the analysis method, and the program described in items described below are described.

(First Item)

An information processing device including:
an experience quality estimation unit that estimates an experience quality value by replacing a plurality of index values included in viewing history data of an image with an index value corresponding to a case other than any one of a plurality of predetermined bit rates;
a contribution degree calculation unit that calculates a contribution degree of each bit rate included in the plurality of bit rates to an experience quality value on the basis of the estimated experience quality value; and
a contribution degree output unit that outputs information indicating the contribution degree.

(Second Item)

The information processing device according to the first item, in which the contribution degree calculation unit calculates, as a contribution degree, a shapley value in cooperative game theory when each bit rate is a player.

(Third Item)

The information processing device according to the first or second item, in which
the plurality of index values includes a value obtained by encoding data obtained by dividing the image at any one of a plurality of predetermined bit rates, and
the experience quality estimation unit estimates an experience quality value by replacing the encoded value with a value corresponding to a case other than any one of a plurality of predetermined bit rates.

(Fourth Item)

The information processing device according to any one of the first to third items, in which
the plurality of index values includes a value based on a time when reproduction stop of the image occurs or a number of times reproduction stop occurs, and
the experience quality estimation unit estimates an experience quality value by replacing the value based on the time when the reproduction stop of the image occurs or the number of times reproduction stop occurs with a value in a case where the reproduction stop of the image does not occur.

(Fifth Item)

The information processing device according to any one of the first to fourth items, further including:
a short-time experience quality estimation unit that estimates a short-time experience quality value at each time on the basis of data obtained by encoding data obtained by dividing the image at any one of a plurality of predetermined bit rates,
in which
the plurality of index values includes the estimated short-time experience quality value.

(Sixth Item)

The information processing device according to the fifth item, in which the experience quality estimation unit estimates an experience quality value by replacing any one of the estimated short-time experience quality values with a lowest possible value or a highest possible value.

(Seventh Item)

An analysis method executed by a computer, the method including:
a step of estimating an experience quality value by replacing a plurality of index values included in viewing history data of an image with an index value corresponding to a case other than any one of a plurality of predetermined bit rates;
a step of calculating a contribution degree of each bit rate included in the plurality of bit rates to an experience quality value on the basis of the estimated experience quality value; and
a step of outputting information indicating the contribution degree.

(Eighth Item)

A program causing a computer to function as each unit of the information processing device according to any one of the first to sixth items.

Although the present embodiments have been described above, the present invention is not limited to such particular embodiments, and various modifications and changes can be made within the scope of the gist of the present invention described in the claims.

REFERENCE SIGNS LIST

10 Information processing device
11 Storage unit
12 Contribution degree calculation unit
13 Experience quality estimation unit
14 Contribution degree output unit
15 Short-time experience quality estimation unit

The invention claimed is:

1. An information processing apparatus comprising:
a memory; and
a processor configured to execute:
storing, in the memory, viewing history data comprising a sequence of representations selected by an adaptive bitrate (ABR) mechanism during video streaming, wherein the representations comprise video chunks encoded at different bit rates;
estimating an experience quality value by replacing a plurality of index values included in the viewing history data of an image with an index value corresponding to a case other than any one of a plurality of predetermined bit rates, wherein the index values comprise audio bit rates, video bit rates, and reproduction stop occurrences that affect user experience quality during video streaming;

calculating a contribution degree of each bit rate included in the plurality of bit rates to an experience quality value using cooperative game theory to determine how each bit rate affects the user experience quality on the basis of the estimated experience quality value; and generating and outputting information indicating the contribution degree for enabling redesign of the ABR mechanism.

2. The information processing apparatus according to claim 1, wherein the calculating includes calculating, as a contribution degree, a shapley value in cooperative game theory when each bit rate is a player.

3. The information processing apparatus according to claim 1, wherein the plurality of index values includes a value obtained by encoding data obtained by dividing the image at any one of a plurality of predetermined bit rates, and the estimating includes estimating an experience quality value by replacing the encoded value with a value corresponding to a case other than any one of a plurality of predetermined bit rates.

4. The information processing apparatus according to claim 1, wherein the plurality of index values includes a value based on a time when reproduction stop of the image occurs or a number of times reproduction stop occurs, and the estimating includes estimating an experience quality value by replacing the value based on the time when the reproduction stop of the image occurs or the number of times reproduction stop occurs with a value in a case where the reproduction stop of the image does not occur.

5. The information processing apparatus according claim 1, further comprising:

estimating a short-time experience quality value at each time on the basis of data obtained by encoding data obtained by dividing the image at any one of a plurality of predetermined bit rates, wherein the plurality of index values includes the estimated short-time experience quality value.

6. The information processing apparatus according to claim 5, wherein the estimating of the experience quality value includes estimating an experience quality value by replacing any one of the estimated short-time experience quality values with a lowest possible value or a highest possible value.

7. An analysis method executed by a computer, the method comprising:

storing, in a memory of the computer, viewing history data comprising a sequence of representations selected by an adaptive bitrate (ABR) mechanism during video streaming, wherein the representations comprise video chunks encoded at different bit rates;

estimating an experience quality value by replacing a plurality of index values included in viewing history data of an image with an index value corresponding to a case other than any one of a plurality of predetermined bit rates, wherein the index values comprise audio bit rates, video bit rates, and reproduction stop occurrences that affect user experience quality during video streaming;

calculating a contribution degree of each bit rate included in the plurality of bit rates to an experience quality value using cooperative game theory to determine how each bit rate affects the user experience quality on the basis of the estimated experience quality value; and generating and outputting information indicating the contribution degree for enabling redesign of the ABR mechanism.

8. A non-transitory computer-readable recording medium having computer-readable instructions stored thereon, which when executed, cause a computer to function as the information processing apparatus according to claim 1.

* * * * *